F. E. DERSCHMIDT.
MINER'S PICK.
APPLICATION FILED JUNE 3, 1911.
1,014,575.
Patented Jan. 9, 1912.
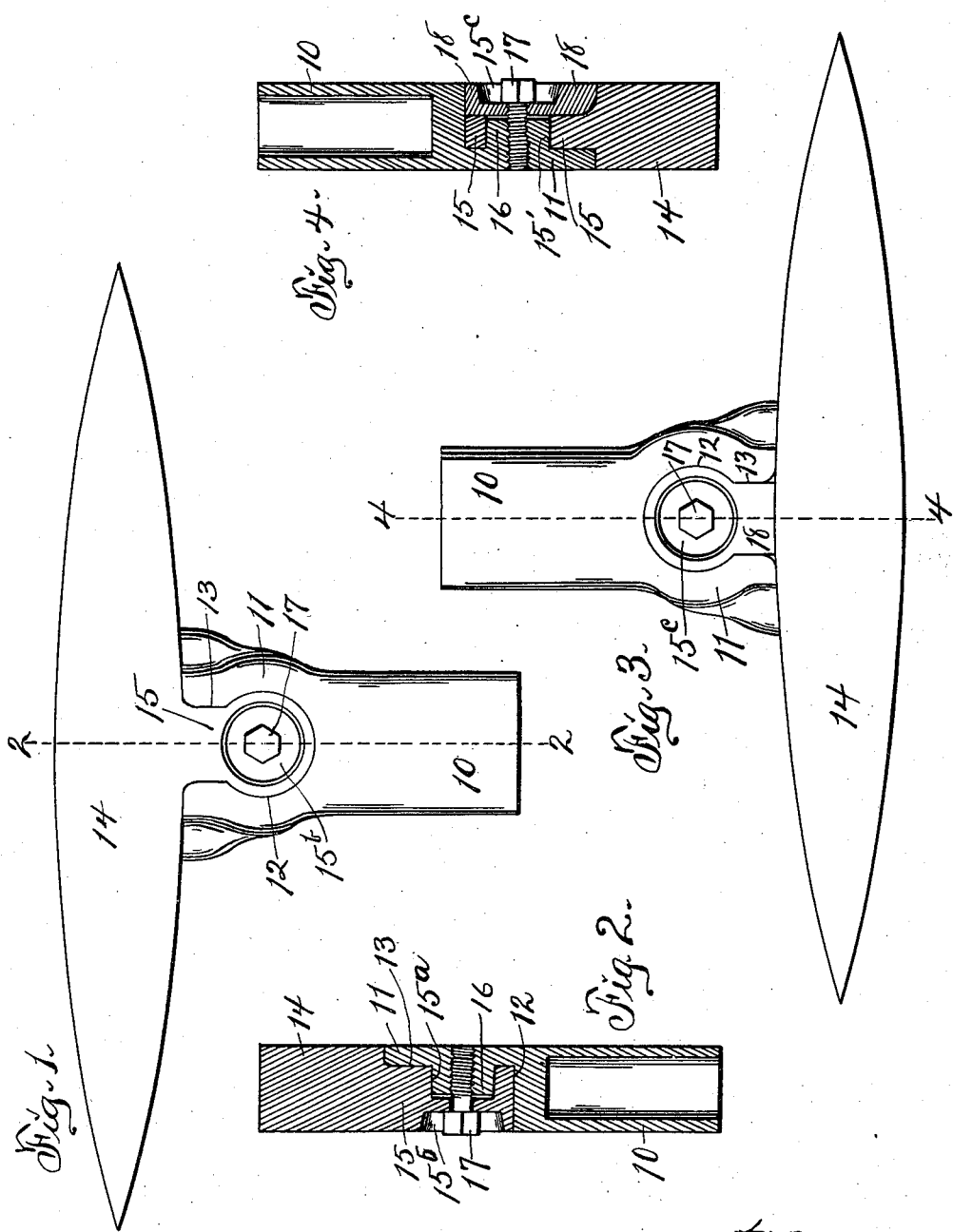

UNITED STATES PATENT OFFICE.

FRANK E. DERSCHMIDT, OF ANKENY, IOWA.

MINER'S PICK.

1,014,575.  Specification of Letters Patent.  Patented Jan. 9, 1912.

Application filed June 3, 1911. Serial No. 630,981.

*To all whom it may concern:*

Be it known that I, FRANK E. DERSCHMIDT, a citizen of the United States of America, and resident of Ankeny, Polk county, Iowa, have invented a new and useful Miner's Pick, of which the following is a specification.

The object of this invention is to provide an improved construction for means for detachably connecting a pick to a handle socket.

A further object of this invention is to provide an improved construction for miners' picks.

A further object of this invention is to provide an improved construction whereby a pick can be removably and replaceably and yet rigidly attached to a handle and socket thereof.

My invention consists in the construction, arrangement and combination of elements hereinafter set forth, pointed out in my claims and illustrated by the accompanying drawing, in which—

Figure 1 is a face view showing my improvement applied as required for practical use. Fig. 2 is a cross-section on the indicated line 2—2 of Fig. 1. Fig. 3 is a face view of a modified form of the device. Fig. 4 is a longitudinal section on the indicated line 4—4 of Fig. 3.

In the construction of the device as shown the numeral 10 designates a handle socket which may be of any desired shape and be provided with any desired means for receiving and securing a handle thereto. The socket 10 is formed with an integral head 11 and said head is formed with a recess or cavity 12 generally of circular shape and having a neck 13 as indicated by the outline in Fig. 1, which cavity or recess opens at one end of the neck to one face of the head and extends approximately two-thirds through the thickness of said head. A pick 14 of conventional shape and of any desired size is formed with stem 15 integral therewith and extending from the center of one side; the stem 15 conforming in outline to and adapted to fit snugly in the cavity of the recess of the head 11. One end portion of the head 11 preferably is formed to contact with and fit snugly to the face of the pick 14 from which the stem 15 centrally projects. The stem 15 preferably is of a thickness corresponding with the depth of the cavity or recess in the head 11. A stud 16 is formed on the head 11 within the recess thereof and approximately centrally of the circular portion of said recess and the stem 15 is formed with a hole 15ª adapted to receive and fit snugly to the stud. The stud 16 preferably is circular in cross-section and of slightly less height than the hole 15ª. The stud 16 is formed with a screw seat perpendicular to the top thereof, which screw seat preferably is centrally of the stud. The stem 15 also is formed with a cavity or recess 15ᵇ in its face concentric with its circular portion and said stem also is formed with a bolt hole communicating between the central portion of said recess and the hole 15ª. The screw seat in the stud 16 also extends through the back of the head 11 and a bolt or screw 17 is mounted through the bolt hole of the stem 15 and through said screw seat. The head of the bolt enters and seats in the cavity 15ᵇ and the opposite end of the bolt is flush with the back of the head 11.

In the construction shown in Figs. 3 and 4 the stem 15 is approximately only one-half the thickness of the stem first described and has the hole 15′ extending entirely through it. A locking block 18, having a shape corresponding with that of the recess or cavity in the head 11 and of a thickness approximating to one-half the depth of said cavity, is mounted in the cavity of the head and overlies the stem 15. The locking block 18 is formed with a countersink 15ᶜ and a screw seat centrally of the cavity and registering with the screw seat in the stud 16 and a screw 17 is mounted in said seat and is adapted to draw the locking block into rigid contact with the stem 15. The head of the screw 17 extends within the cavity 15ᶜ in the locking block. It is the function of the locking block, in overlying the stem 15, to hold said stem rigidly in the bottom of the recess or cavity of the head 11 and thus firmly, rigidly and yet detachably connect the pick to the head.

I claim as my invention—

1. A miner's pick, comprising a handle socket formed with a side-opening cavity, a pick having a laterally extending, centrally located, integral stem fitting within said cavity, and a bolt connecting said socket and stem transversely.

2. A miner's pick, comprising a handle socket formed with a side-opening cavity and formed with a stud, a pick having a stem extending within and fitted to said cavity and formed with a hole receiving said stud, and a bolt connecting said stud and stem transversely, said stem formed integrally with and extending laterally from the central portion of the pick.

3. A miner's pick, comprising a handle socket formed with a side-opening cavity said cavity also opening to one side of said socket, a pick having a stem extending within and fitted to said cavity, a locking block overlying said stem, and detachable connections between said locking block and socket, said stem being formed on and extending laterally from the central portion of said pick, the side faces of the pick and socket being flush.

4. A miner's pick, comprising a handle socket formed with a side-opening cavity of key-hole form, a pick having an integral, laterally projecting stem extending within and fitting to said cavity one end portion of said socket fitted to and abutting the face of the pick on opposite sides of said stem, a locking block overlying said stem within said cavity, and detachable connections between said locking block and socket.

5. A miner's pick, comprising a handle socket formed with a side-opening cavity opening through one end of said socket, a pick having an integral, laterally projecting stem extending within and fitted to said cavity, a locking block overlying said stem within said cavity, a stud formed on said socket within said cavity and extending through said stem, and detachable connections between said locking block and stud, one end of the socket being fitted to and abutting one face of the pick on opposite sides of said stem, the outer face of the stem and adjacent side face of the pick being flush with the adjacent side face of the socket, the opposite faces of the pick and socket also being flush.

6. A miner's pick, comprising a handle socket formed with a side-opening cavity, a pick having a stem extending within said cavity, a locking block overlying said stem, a stud formed on the socket within said cavity and extending through said stem, said stud and locking block formed with registering screw seats, and a connecting screw in said seats, the head of said screw countersunk in the outer face of the locking block.

7. A miner's pick, comprising a handle socket formed with a side-opening cavity, a pick having a stem extending within said cavity, a locking block overlying said stem, a stud formed on the socket within said cavity and extending through said stem, said stud and locking block formed with registering screw seats, and a connecting screw in said seats, the head of said screw countersunk in the outer face of the locking block, the socket, locking block and pick formed with fitted contacting faces.

Signed by me at Des Moines, Iowa, this fifth day of April, 1911.

FRANK E. DERSCHMIDT.

Witnesses:
S. C. SWEET,
EARL M. SINCLAIR.

---

Copies of this patent may be obtained for five cents each, by addressing the "Commissioner of Patents, Washington, D. C."